Figure 1:
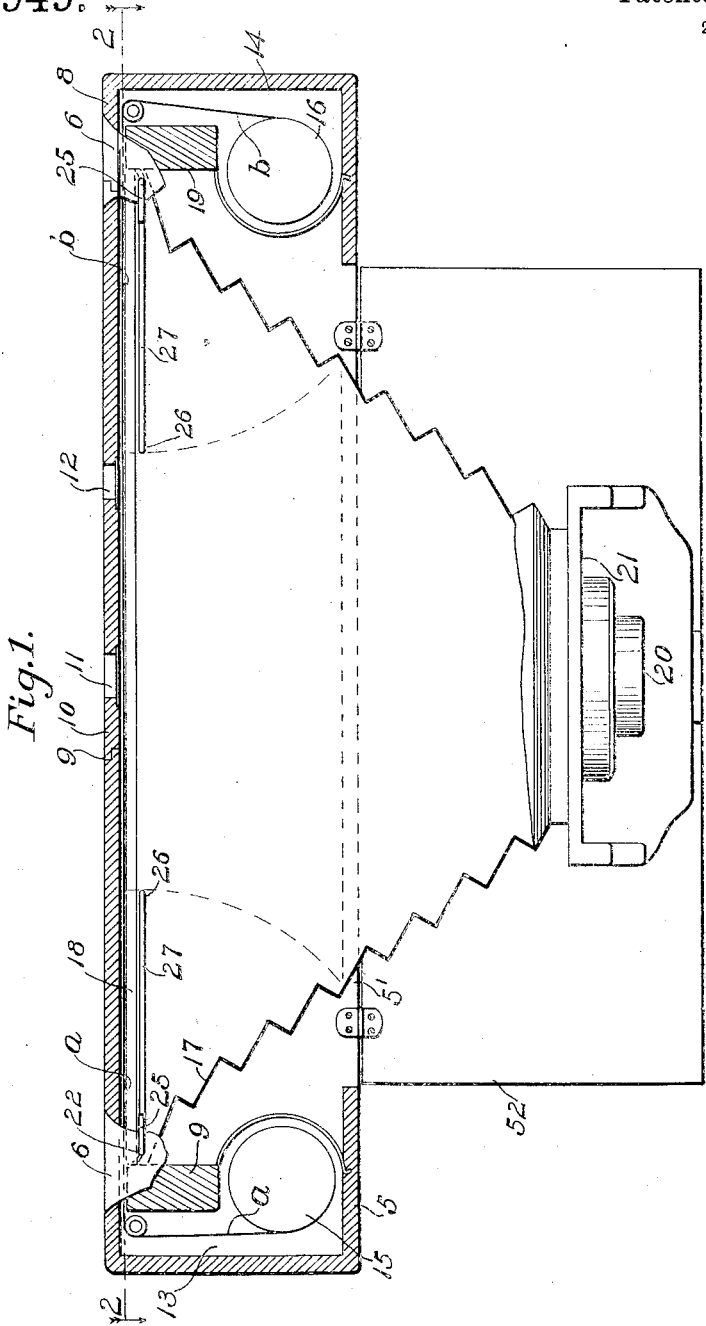

I. A. BELL.
PHOTOGRAPHIC CAMERA.
APPLICATION FILED OCT. 4, 1909.

999,949.

Patented Aug. 8, 1911.
2 SHEETS—SHEET 1.

Witnesses.
H. C. Witt.
E. H. Wilder.

Inventor.
Isaac A. Bell
By Henry J. Miller
atty

I. A. BELL.
PHOTOGRAPHIC CAMERA.
APPLICATION FILED OCT. 4, 1909.
999,949.
Patented Aug. 8, 1911.
2 SHEETS—SHEET 2.
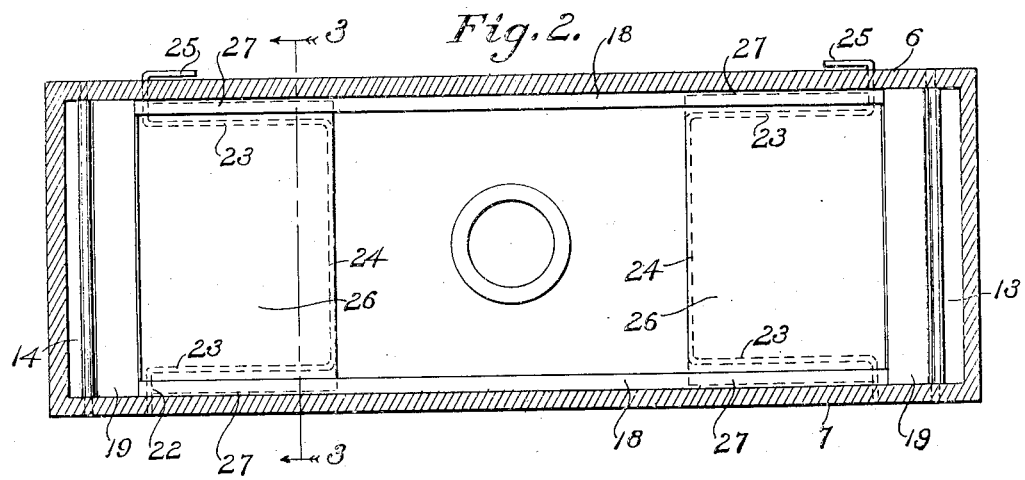
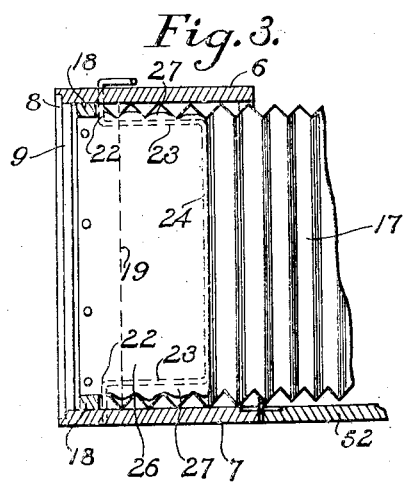
Witnesses.
H. C. Witt.
E. H. Wilder.
Inventor.
Isaac A. Bell
By Henry J. Miller
atty.

UNITED STATES PATENT OFFICE.

ISAAC A. BELL, OF OTTUMWA, IOWA.

PHOTOGRAPHIC CAMERA.

999,949. Specification of Letters Patent. Patented Aug. 8, 1911.

Application filed October 4, 1909. Serial No. 520,960.

*To all whom it may concern:*

Be it known that I, ISAAC A. BELL, of Ottumwa, in the county of Wappello and State of Iowa, have invented certain new and useful Improvements in Photographic Cameras, of which the following is a specification, reference being had to the accompanying drawings, forming part thereof.

This invention has reference to improvements in photographic cameras and relates particularly to means for controlling the exposure of the photographic film.

The object of the invention is to so construct a photographic camera that portions of the sensitive plate or film contained therein may be protected, by adjustable light excluding means, from the rays of light passing through the lens.

Another object of the invention is to so construct a photographic camera that the field of the sensitive plate or film therein may be varied as to size.

Other objects of the invention will appear from the following description.
The invention consists in such novel features of construction and combination of parts as shall hereinafter be more fully described and pointed out in the claims.

Figure 1, represents a plan view, partly in section, of a photographic camera of well known construction illustrating my new invention. Fig. 2, represents a rear view of the same to more clearly show the construction of the adjustable light excluding means, the door being removed. Fig. 3, represents a sectional view taken on line 3—3 Fig. 2.

Similar numbers of reference designate corresponding parts throughout.

In the drawings I have shown the improved light excluding means in combination with a camera of the general construction shown and described in the Letters Patent of the United States No. 885,010 granted to me April 21, 1908, but, it will be seen from the following description that this improvement may be applied to any ordinary camera whether the same is adapted for use with photographic films or plates, and it is obvious that this light excluding means will operate with or without the bellows extension.

As shown herein, in its preferred form, 5 represents the usual camera body or box having the top 6, the bottom 7, the back 8 having the opening 9 closed by the door 10 which is furnished with the two openings 11 and 12 closed by semitransparent material of a color adapted to exclude white light rays while permitting the viewing of the usual numbers on the film. The end compartments 13 and 14 are furnished with the usual film spools 15 and 16 and the sensitive film *a—b* is sustained by said spools close to the door 10. Interiorly the box 5 is furnished with the extension bellows 17, generally pyramidal in shape, and secured at the rear portion of the case to or beneath the internal strips 18 and 19, which are in front of the film position. The small end of said extension bellows is furnished with the lens 20 mounted in the frame 21. This frame 21 is movable through the opening 5′ of the casing or box 5 for adjustment of the lens relative to the film *a—b* and provision is made for closing the opening 5′ by means of the hinged closure 52 which also acts to sustain the lens 20 and its frame 21 when the bellows is extended to the position shown in Fig. 1.

Journaled in the top 6 and bottom 7 at points near the juncture of the bellows 17 with the strips 18 and 19 are the shafts 22, 22, which have the laterally extending bent arms 23, 23 connected by the members 24, 24, and furnished at the ends which extend above the top 6 with the handles 25, 25, or similar means for partially rotating said shafts. On the frames formed by the arms 23, 23 and the members 24, 24, are mounted screens 26, 26, of material impervious to rays of light and preferably flexible, one edge of said material being secured to the upright strips 19, 19 while above and below the arms 23, 23 the edge portions of such material extend to form flexible flaps 27, 27 adapted to wipe against the folds of the bellows 17, when in the position shown in Fig. 3 and extending above and below the edges of the respective strips 18, 18, to close the opening therebetween as shown in Fig. 2. With the screens 26, 26 in the position shown in full lines in Fig. 1 that portion of the photographic plate or film between the free edges of said screens receives rays of light passing the lens and the field photographed on said plate or film is restricted while, when said screens 26, 26, are swung, by their handles, against the sides of the bellows, a considerably greater length of the photographic plate or film is exposed to the light rays. It is of course preferable that the angle of the lens should be sufficient to reflect an exterior field proportionate to the length of the plate or film exposed by such opening of the screens 26, 26. When the screens 26, 26 are in the positions shown in Fig. 1 of the drawings the film a—b is positioned by bringing the number of the film opposite the opening 11 but when it is desired to photograph a larger field the film number is brought opposite opening 12 whereby a greater portion of the film is moved forward.

By the use of the two windows 11 and 12 either one of two sizes of negatives may be made without loss of film and the film may be adjusted with respect to the lens that the focus of the lens may be central of the negative of either size.

Having thus described my invention I claim as new and desire to secure by Letters Patent—

1. A photographic camera comprising a casing having a lens, and a pair of light excluding screens pivotally mounted between said lens and the back of the casing, said screens having flexible edges adapted to accommodate themselves to irregularities with which they contact.

2. A photographic camera comprising a casing having a back, an extension bellows secured within said casing adjacent said back and having upper and lower strips contracting the largest opening of said bellows and positioned at a distance from said casing back, a lens carried by the forward end of the bellows, means for sustaining a photographic plate or film between said strips and said back, and light excluding means movably mounted within the rear portion of said bellows and having a dimension greater than the opening between said strips.

3. The combination with a film camera, of independently movable screens mounted in the interior of the camera on opposite sides thereof adjacent to the camera back, and at each end of the field of exposure, said screens being independently movable into position to cut off a portion of the exposure field or out of such position, the total width of said screens being less than the total length of the field of exposure.

4. The combination with a film camera, of independently movable screens mounted in the interior of the camera adjacent to the camera back, and at each end of the field of exposure, said screens being movable into position to cut off a portion of the exposure field, or out of said position, the total width of said screens being less than the total length of the field of exposure, and means extending out of the camera whereby each screen may be independently moved.

5. The combination with a film camera, of rotatable spindles mounted on the rear of the camera adjacent to the camera back and at each end of the field of exposure, and screens attached one to each spindle and movable thereby into position to cut off a portion of the exposure field, or out of such position, said spindles extending out of the camera and being each provided with means whereby they may be oscillated.

6. The combination with a camera of independently rotatable spindles mounted on the interior of the camera adjacent to the camera back and at each end of the field of exposure, screens connected one to each spindle and independently movable into position to cut off a part of the exposure field, or out of such position, said spindles extending out of the camera and being provided with means whereby the spindles may be independently oscillated, and means for holding the screens in their adjusted positions.

7. The combination with a film camera having rotatably mounted exposure screens at its rear end adjacent to the camera back, said screens being adapted to be moved into position to cut off the field of the camera, or out of such position, of a back plate having therein a series of sight openings through which the numbers on the film may be observed.

8. In a film-carrying camera, a movable screen mounted in the interior of the camera at its rear end but inward of the camera back, said screen being adapted to be moved into position to partially cut off the field of the camera or out of said position, and a back for the camera having therein sight openings through which the numbers on the film may be observed.

ISAAC A. BELL.

Witnesses:
P. ACHLEY,
T. K. HARLAN.